United States Patent
Eilemann et al.

(10) Patent No.: US 9,551,274 B2
(45) Date of Patent: Jan. 24, 2017

(54) HEAT EXCHANGER FOR COOLING CHARGE AIR

(71) Applicant: MAHLE International GmbH, Stuttgart (DE)

(72) Inventors: Andreas Eilemann, Erdmannhausen (DE); Matthias Fehrenbach, Stuttgart (DE); Ruediger Koelbin, Essslingen (DE); Johann Ehrmanntraut, Lorch (DE)

(73) Assignee: MAHLE International GmbH, Stuttgart (DE)

( * ) Notice: Subject to any disclaimer, the term of this patent is extended or adjusted under 35 U.S.C. 154(b) by 149 days.

(21) Appl. No.: 13/621,575

(22) Filed: Sep. 17, 2012

(65) Prior Publication Data

US 2013/0067912 A1 Mar. 21, 2013

(30) Foreign Application Priority Data

Sep. 15, 2011 (DE) .................. 10 2011 082 797

(51) Int. Cl.
| | |
|---|---|
| *F28F 9/02* | (2006.01) |
| *F02B 29/04* | (2006.01) |
| *F28D 7/00* | (2006.01) |

(52) U.S. Cl.
CPC ....... *F02B 29/0412* (2013.01); *F02B 29/0462* (2013.01); *F28D 7/0091* (2013.01);
(Continued)

(58) Field of Classification Search
CPC .... F28D 1/0426; F28D 1/0435; F28D 1/0443; F28D 1/0452; F28F 2265/26
(Continued)

(56) References Cited

U.S. PATENT DOCUMENTS 2,843,367 A * 7/1958 Bogus et al. .................. 165/78
5,992,514 A * 11/1999 Sugimoto ............. F28D 1/0435
165/135
(Continued)

FOREIGN PATENT DOCUMENTS

DE        24 23 440 A1    11/1975
DE       199 61 199 A1     6/2001
(Continued)

OTHER PUBLICATIONS

Wolter, DE19961199TRANS (English Translation), Jun. 2001, Germany.*
Kunihiko, JP2000193393TRANS (English Translation), Jul. 2000.*
Arai, JPH1148798TRANS (English Translation), Feb. 1999.*

*Primary Examiner* — M. Alexandra Elve
*Assistant Examiner* — Eric Ruppert
(74) *Attorney, Agent, or Firm* — Muncy, Geissler, Olds & Lowe, P.C.

(57) ABSTRACT

A heat exchanger for cooling of charge air for an internal combustion engine of a motor vehicle is provided. The heat exchanger has a preliminary stage, a main stage, and a compensating component. The preliminary stage has at least one preliminary stage fixed bearing base and a preliminary stage floating bearing base. The main stage has at least one main stage fixed bearing base and a main stage floating bearing base. In a heat transfer region of the main stage, at least one main stage channel for a main stage coolant is disposed. The compensating component is configured to compensate a position difference between corresponding components of the preliminary stage and the main stage, whereby the position difference is based on a thermally induced elongation difference between the at least one preliminary stage channel and the at least one main stage channel.

12 Claims, 3 Drawing Sheets (52) U.S. Cl.
CPC .............. *F28F 9/02* (2013.01); *F28F 9/0241* (2013.01); *F28F 2265/26* (2013.01); *Y02T 10/146* (2013.01)

(58) Field of Classification Search
USPC .......................................... 165/81, 135, 140
See application file for complete search history.

(56) References Cited

U.S. PATENT DOCUMENTS

| | | | |
|---|---|---|---|
| 6,189,603 | B1 | 2/2001 | Sugimoto et al. |
| 6,328,098 | B1 * | 12/2001 | Kodumudi et al. .......... 165/149 |
| 7,198,095 | B2 * | 4/2007 | Nguyen ........................ 165/81 |
| 7,490,659 | B2 * | 2/2009 | Kwon et al. ................. 165/140 |
| 7,721,791 | B2 * | 5/2010 | Hayasaka et al. ............. 165/81 |
| 7,905,277 | B2 * | 3/2011 | Riondet et al. .............. 165/135 |
| 2005/0006069 | A1 * | 1/2005 | Kamiyama et al. ......... 165/140 |
| 2005/0109483 | A1 | 5/2005 | Kolb |
| 2005/0109484 | A1 | 5/2005 | Kolb et al. |
| 2006/0108101 | A1 * | 5/2006 | Hunzinger et al. ........... 165/81 |
| 2008/0169090 | A1 * | 7/2008 | Riondet et al. .............. 165/149 |

FOREIGN PATENT DOCUMENTS

| | | | |
|---|---|---|---|
| DE | 19961199 | * | 6/2001 |
| DE | 699 02 614 T2 | | 8/2003 |
| JP | H1148798 | * | 2/1999 |
| JP | 2000193393 | * | 7/2000 |
| WO | WO 2004/044512 A1 | | 5/2004 |

* cited by examiner

HEAT EXCHANGER FOR COOLING CHARGE AIR

This nonprovisional application claims priority under 35 U.S.C. §119(a) to German Patent Application No. DE 10 2011 082 797.8, which was filed in Germany on Sep. 15, 2011, and which is herein incorporated by reference.

BACKGROUND OF THE INVENTION

Field of the Invention

The present invention relates to a heat exchanger for cooling charge air for an internal combustion engine of a motor vehicle.

Description of the Background Art

In conventional charge air cooling in a motor vehicle, the charge air is compressed, for example, by means of an exhaust turbocharger or compressor and cooled after the compression in a charge air cooler to increase the charge air density. The charge air cooler can be made as a direct charge air cooler with a direct heat transfer between the ambient air and charge air. Likewise, the charge air cooler can be made as an indirect charge air cooler with heat transfer from the charge air to a coolant with a high heat capacity, for example, cooling water. As a result, the indirect charge air cooler can be made compact.

SUMMARY OF THE INVENTION

It is therefore an object of the present invention to provide an improved heat exchanger for cooling charge air for an internal combustion engine of a motor vehicle.

More highly supercharged passenger vehicle engines result in constantly rising requirements for charge air cooling. The charge pressure linked directly to the charging, particularly to the turbocharging, in turn causes increasing charge air temperatures, which today reach values of 210° C. or more. At the same time, the requirements within the scope of the charge air cooling become increasingly greater for a low charge air pressure drop and small packaging, therefore a small installation space. Conventional single-stage charge air cooling with a coolant circuit has a limited cooling performance due to the low-temperature circuit or the low-temperature coolant cooler. Because of this limitation, for demanding applications a "cascaded" charge air cooling (high-temperature circuit and low-temperature circuit) can be provided in the intake manifold. In order to satisfy the requirements for a small installation space and in addition small charge air pressure drops, the cascaded charge air cooling can be disposed in a one-piece charge air cooler, which contains both cooling circuit stages, therefore high temperature and low temperature. The different temperatures in the high-temperature or low-temperature cooling circuits cause different thermal expansions in both coolant stages, which in turn without further measures can lead to uncontrolled damage to the one-piece charge air cooler.

In a heat exchanger, which combines several stages in a cartridge that can be slid in or inserted, because of thermal stress, strength values can be exceeded in the material during operation. Leaks can occur for this reason at highly stressed places and these can lead to heat exchanger failure. In an arrangement of a plurality of tube rows in the charge air flow direction, which simultaneously can carry differently tempered cooling media, extreme thermomechanical stress could occur without further measures at the connection sites such as the tube-base connections because of the different thermal expansions. Such stress can lead to uncontrolled damage to these structural parts.

The present invention is based on the realization that a flexible area or an area with a low stiffness can be disposed between two areas with expected different thermal expansions. The flexible area can compensate for shifting between the two areas. If the shifting is greater than a provided distance, the flexible area can be deformed permanently and thus protect joints within the two areas from harmful stress peaks.

Advantageously, the lifetime of a heat exchanger can be increased by avoiding stress peaks in sensitive joints or thin-walled parts. A flexible connecting area can facilitate the handling of the heat exchanger, for example, during assembly, because the heat exchanger can be installed as a complete component despite the multistage configuration.

An increase in charge air performance can also be achieved proceeding with a reduction of the installation space for charge air cooling and a reduction of the charge air pressure drop. A reduction of the thermomechanical stresses in the structural parts and thereby a prolongation of the part lifetime result due to a thermomechanical decoupling of the two coolant stages and the realization of a predetermined breaking point. Better handling during assembly results due to a reduction of the number of the individual parts during production. In addition, a reduction of sealing elements is possible.

The present invention provides in an embodiment, a heat exchanger for cooling of charge air for an internal combustion engine of a motor vehicle, whereby the heat exchanger has the following features:

a preliminary stage, which has as components of the preliminary stage at least one preliminary stage fixed bearing base and a preliminary stage floating bearing base, whereby in a heat transfer region of the preliminary stage at least one preliminary stage channel for a preliminary stage coolant is disposed between the preliminary stage fixed bearing base and the preliminary stage floating bearing base;

a main stage, which has as components of the main stage at least one main stage fixed bearing base and a main stage floating bearing base, whereby the main stage fixed bearing base is connected fixedly to the preliminary stage fixed bearing base, and in a heat transfer region of the main stage at least one main stage channel for a main stage coolant is disposed between the main stage fixed bearing base and the main stage floating bearing base; and a component for compensating a position difference between corresponding components of the preliminary stage and components of the main stage, whereby the position difference is based on a thermally induced elongation difference between the at least one preliminary stage channel and the at least one main stage channel.

Charge air can be understood as air that has been compressed with respect to an ambient pressure to a higher charge pressure. The charge air can also have been heated with respect to an ambient temperature to a higher charge air temperature. The charge air can have been compressed and/or heated by means of a compressor with input of energy. To obtain a higher density and thereby a higher oxygen amount in an internal combustion engine, particularly in combustion chambers of a combustion engine, the charge air is to be cooled by means of a heat exchanger, the charge air cooler. The heat exchanger may have at least two stages. The stages can be configured to operate with different cooling media. For example, a preliminary stage can be operated as a cooling medium with coolant from a high-temperature cooling water circuit. The main stage can be operated, for example, with coolants from a low-temperature cooling water circuit. The preliminary stage can extract a first energy amount from the charge air. The main stage can extract a second energy amount from the charge air. Stress on individual systems can be reduced by dividing a total energy amount into at least two energy amounts. Because of the different operating temperatures in the different stages, the stages overall and particularly lines and channels in a heat transfer region of the stages can have different changes in length due to thermal expansion. A base can be understood to be a plate with openings, which separates the channels on one side from a tank on an opposite side. The channels open into the openings. The tank is formed to collect fluid from the channels or to distribute fluid to the channels. A stage has at least two bases. The channels are disposed between the bases and the heat transfer region is here as well. To enable a statically determined placement of a stage, one of the bases is connected as a fixed bearing base in all spatial directions fixedly to a support component. The other base is supported as a floating bearing base in two spatial directions, and in one spatial direction placed movable to the support component. The movable spatial direction corresponds to a main extension direction and main expansion direction of the channels. The fixed bearing bases of the preliminary stage and main stage can be oriented in a mutual main extension direction and be connected together as a single piece.

The compensating component can have a plurality of crosspieces between one of the components of the preliminary stage and a corresponding component of the main stage. A crosspiece can be a strip of material. The crosspieces can be connected in each case on one side to the component of the preliminary stage and on the other side to the component of the main stage. For example, the strips can be soldered on. The forces between the components can be concentrated in small material cross sections by the crosspieces. The small cross sections have a low stiffness, so that the crosspieces are deformed before the components are deformed.

The component of the preliminary stage and the corresponding component of the main stage can be made as a single piece with a plurality of punched out apertures lying inbetween, whereby the plurality of crosspieces is disposed between the apertures. The crosspieces can remain between the components after a processing step, whereby in the processing step the apertures are introduced into a starting part. The apertures can line up in a line that runs between the preliminary stage and the main stage. The apertures can be made in the style of a perforation.

The crosspieces further can have an expansion bend each. An expansion bend can provide lengthened crosspieces, although a distance between components is small. The crosspieces have an increased effective length due to the expansion bends, so that a greater absolute change in length is possible with the same percentage change in length. The expansion bends can be, for example, semicircular or have the form of sections of a circle. Likewise, the expansion bends can be bent with sharp edges, therefore, for example, have a U-shape or V-shape.

The compensating component can have at least one overlapping plate, which covers a gap between one of the components of the preliminary stage and a corresponding component of the main stage, whereby the overlapping plate is connected to the component of the preliminary stage or the component of the main stage. An overlapping plate can lie on the two corresponding components. The overlapping plate can seal the gap. The overlapping plate can be broader than the gap. The overlapping plate can be connected fixedly to one of the components, for example, by means of a solder joint. Because of the overlapping plate, the components can move freely against one another without stress.

The compensating component can be made with a predetermined breaking point, which is formed to compensate the position difference by means of plastic deformation and/or material failure, when the position difference is greater than a threshold value. A threshold value can be understood to be, for example, a material constant, such as a tensile strength of the crosspiece material on a cross-sectional area of the compensating component. By means of a structural design of the crosspieces, a maximally acting force up to the material failure can be established in this way.

The preliminary stage and the main stage can have as a component further at least one corresponding side plate each to delimit the respective heat transfer region, whereby the compensating component can be configured to compensate a position difference between corresponding side plates of the preliminary stage and the main stage. A side plate can be understood to be a limiter plate of the heat transfer region at the two opposite sides oriented transverse to the flow direction in an air channel. The heat exchanger can be designed to be easy to use by means of a side plate. The side plate can protect sensitive components of the heat exchanger. A perforation or an overlapping plate or crosspieces can also be disposed between two abutting side plates as a compensating component.

The preliminary stage and the main stage can have as a component further at least one corresponding corrugated fin each in the heat transfer region, which is connected to the preliminary or main stage channel in a heat-conducting manner, whereby the compensating component can be designed to compensate the position difference between corresponding corrugated fins of the preliminary stage and the main stage. A corrugated fin can enlarge a heat transfer surface. A perforation or an overlapping plate or crosspieces can also be disposed between two abutting corrugated fins as a compensating component.

The preliminary stage floating bearing base and the main stage floating bearing base can be connected by compensating component and together have an outer contour for sliding or insertion into a seat for the heat exchanger. The outer contour can correspond, for example, to a clear cross section of a seat for the heat exchanger. A seat for the heat exchanger can be, for example, a receiving slot which is transverse to a charge air channel and is formed to integrate the heat exchanger into the charge air channel.

The preliminary stage fixed bearing base and the main stage fixed bearing base together can form a flange for fastening the heat exchanger in a seat for the heat exchanger. The flange can have a sealing surface for sealing against the seat. The flange can have fastening elements for fastening the heat exchanger to the seat.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

In the following description of the preferred exemplary embodiments of the present invention, the same or similar reference characters are used for elements with a similar action and shown in the different drawings, whereby a repeated description of these elements is omitted.

Figure 1:
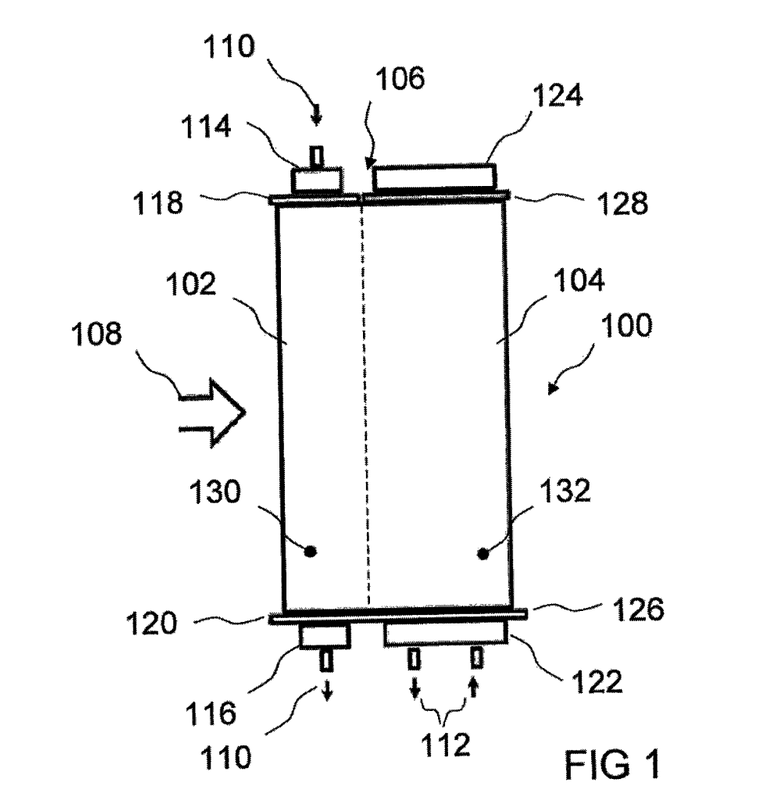
FIG. 1 shows an illustration of a heat exchanger according to an exemplary embodiment of the present invention.

FIG. 1 shows an illustration of a heat exchanger 100 according to an exemplary embodiment of the present invention. Heat exchanger 100 has a preliminary stage 102 and a main stage 104. Preliminary stage 102 and main stage 104 are disposed within a single structural part and connected by means of a compensating component 106. Preliminary stage 102 is disposed transverse to a charge air stream 108 upstream of main stage 104. Charge air stream 108 has a high temperature before preliminary stage 102. The temperature is reduced in preliminary stage 102 in that thermal energy is transferred from charge air stream 108 to a first coolant stream 110, here, for example, a high-temperature coolant stream, by preliminary stage 102. In main stage 104, the temperature of charge air stream 108 is reduced further, in that further thermal energy is transferred from the charge air stream to a second coolant stream 112, here for example, low-temperature coolant stream, by main stage 104. In this exemplary embodiment, coolant stream 110, in this case cooling water, is introduced on one side into a distribution tank 114 of preliminary stage 102 and divided among a plurality of preliminary stage channels. On an opposite side of preliminary stage 102, coolant stream 110 is collected from the preliminary stage channels in a collecting tank 116 and discharged from preliminary stage 102. Preliminary stage 102 for distribution of coolant stream 110 has a preliminary stage floating bearing base 118 between distribution tank 114 and the preliminary stage channels. Preliminary stage 102 has a preliminary stage fixed bearing base 120 between the preliminary stage channels and collecting tank 116. Coolant stream 110 is carried to charge air stream 108 in the cross-flow principle through the preliminary stage channels. Low-temperature coolant stream 112 is carried on the side of heat exchanger 100 into main stage 104, to which high-temperature coolant stream 110 is carried from preliminary stage 102. Low-temperature coolant stream 112 is distributed in a distribution and collecting tank 122 to a plurality of main stage channels. On the other side of main stage 104, low-temperature coolant stream 112 is diverted in a diverting tank 124 and thereby collected from the main stage channels and distributed to additional main stage channels. The additional main stage channels again open into distribution and collecting tank 122, where low-temperature coolant stream 112 is carried out of main stage 104 on the same side as it was fed in. A main stage fixed bearing base 126 is disposed between distribution and collecting tank 122 and the main stage channels and the additional main stage channels. A main stage floating bearing base 128 is disposed between the main stage channels and the additional main stage channels and the diverting tank 124. Preliminary stage fixed bearing base 120 and main stage fixed bearing base 126 are made as a single piece and together form a projecting sealing and fastening flange for fastening heat exchanger 100 in a seat for heat exchanger 100. The preliminary stage channels are covered on both sides by a preliminary stage side plate 130, which together with preliminary stage fixed bearing base 120 and preliminary stage floating bearing base 118 forms a rectangular cross section for a charge air channel. The main stage channels and the additional main stage channels are covered on both sides by a main stage side plate 132, which together with main stage fixed bearing base 126 and main stage floating bearing base 128 continue the rectangular cross section for the charge air channel. Preliminary stage side plate 130 and main stage side plate 132 are connected to one another, movable against one another, by compensating component 106. In this exemplary embodiment, preliminary stage side plate 130 and main stage side plate 132 are made as a single piece and as compensating component 106 have a perforation which runs between preliminary stage 102 and main stage 104. Preliminary stage floating bearing base 118 and main stage floating bearing base 128 are also connected to one another, movable against one another, by compensating component 106. Together, preliminary stage floating bearing base 118 and main stage floating bearing base 128 have a cross section which corresponds to a cross section of the seat for heat exchanger 100.

Figure 2:
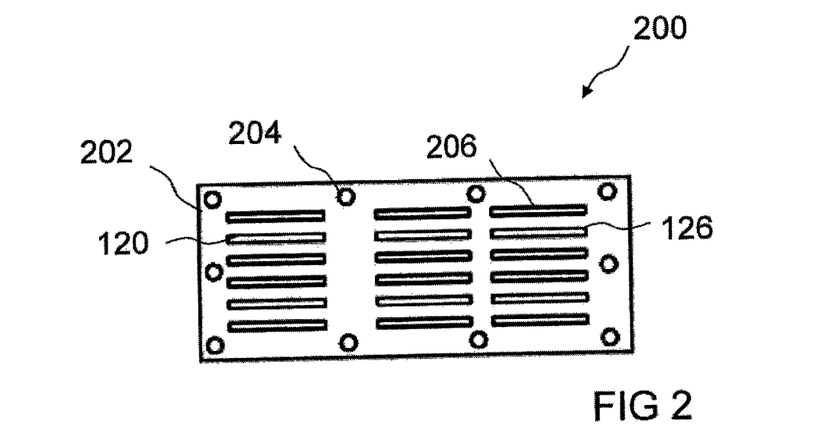
FIG. 2 shows an illustration of a fixed bearing base for a heat exchanger according to an exemplary embodiment of the present invention.

FIG. 2 shows an illustration of a fixed bearing base 200 for a heat exchanger according to an exemplary embodiment of the present invention. Fixed bearing base 200 has two functionally separated areas within a rectangular contour. A first smaller area is a preliminary stage fixed bearing base 120, and a second larger area is a main stage fixed bearing base 126. In this case, fixed bearing base 200 corresponds to the fixed bearing base as it is shown in FIG. 1. In an edge area, fixed bearing base 200 has a sealing and flange region 202, in which a plurality of mounting holes 204 are disposed. In this exemplary embodiment, 10 mounting holes are disposed distributed over sealing and flange region 202. Preliminary stage fixed bearing base 120 has a slot pattern of apertures 206 for receiving a plurality of preliminary stage channels, which are disposed in a flow direction of a charge air stream through the heat exchanger. Main stage fixed bearing base 126 has the same slot pattern arranged twice next to one another. In this exemplary embodiment, there are six apertures 206, arranged one above the other, per slot pattern.

Figure 3A:
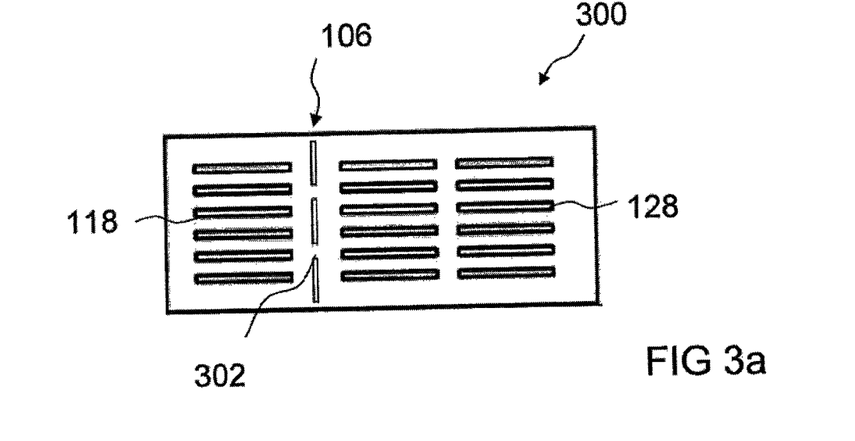
FIG. 3a shows an illustration of a floating bearing base for a heat exchanger according to an exemplary embodiment of the present invention.
Figure 3B:
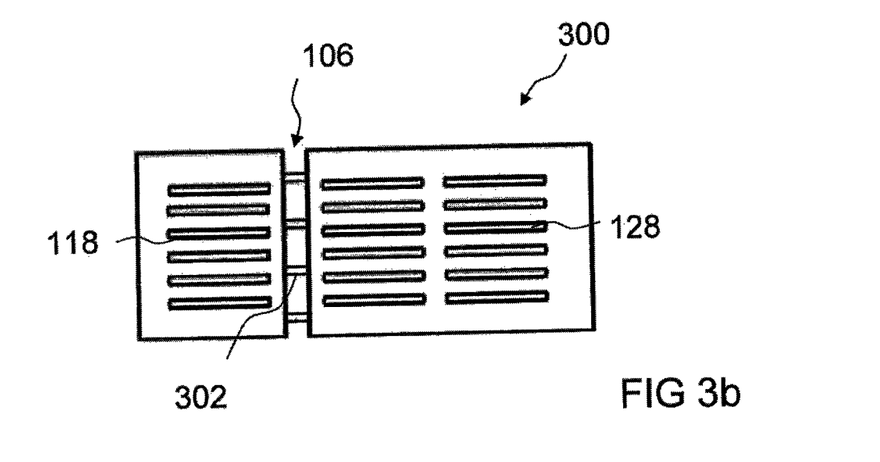
FIG. 3b shows an illustration of a floating bearing base for a heat exchanger according to a further exemplary embodiment of the present invention.
Figure 3C:
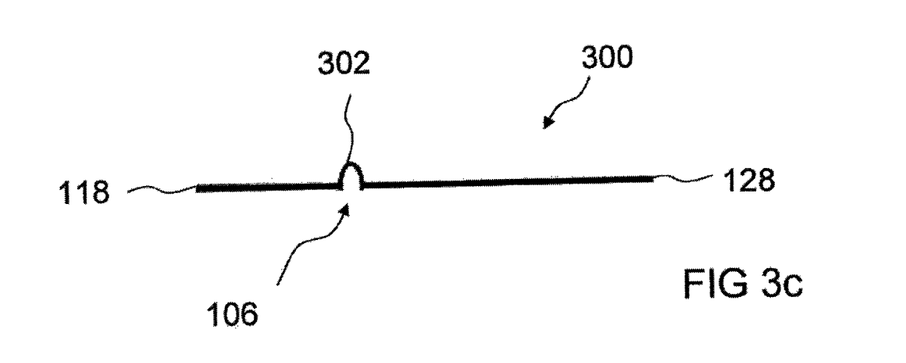
FIG. 3c shows a plan view of a floating bearing base for a heat exchanger according to an exemplary embodiment of the present invention.

FIGS. 3a, 3b, and 3c show illustrations of different exemplary embodiments of floating bearing bases 300 according to the present invention. Floating bearing bases 300 have two functionally separated areas each within a rectangular contour. A first smaller area is a preliminary stage floating bearing base 118, and a second larger area is a main stage floating bearing base 128. In this case, floating bearing bases 300 correspond to the fixed bearing base as it is shown in FIG. 1. Floating bearing bases 300 have the same slot pattern as the fixed bearing base in FIG. 2. In contrast to the fixed bearing base of FIG. 2, the floating bearing bases have a contour which corresponds to a cross section of a seat for receiving the heat exchanger. Preliminary stage floating bearing base 118 and main stage floating bearing base 128 are connected by a compensating component 106.

In FIG. 3a, preliminary stage floating bearing base 118 and main stage floating bearing base 128 are made as a single piece. Compensating component 106 is made as a slot row with intermediate crosspieces 302 in the style of a perforation. Crosspieces 302 are the remnants of the material of preliminary stage floating bearing base 118 and of main stage floating bearing base 128. Crosspieces 302 have a smaller cross section than preliminary stage floating bearing base 118 and main stage floating bearing base 128. For this reason, crosspieces 302 have a lower stiffness than preliminary stage floating bearing base 118 and main stage floating bearing base 128. Crosspieces 302 permit compensation of thermal shifts between preliminary stage floating bearing base 118 and main stage floating bearing base 128 by means of a deformation. With small shifts, the deformation can occur within an elastic range, and with large shifts the deformation occurs within a plastic range. In the case of very large shifts, the deformation can exceed a strength of crosspieces 302 and the crosspieces can be severed. Because of the low stiffness of crosspieces 302, connections between the channels and preliminary stage floating bearing base 118 and main stage floating bearing base 128 are protected from overloading by thermal stresses.

In FIG. 3b, crosspieces 302 are arranged afterwards over a gap between preliminary stage floating bearing base 118 and main stage floating bearing base 128. And they fulfill the same function as crosspieces 302 in FIG. 3a.

A view of a narrow side of preliminary stage floating bearing base 118 and main stage floating bearing base 128 is shown in FIG. 3c. Crosspieces 302 have expansion bends, so that the gap between preliminary stage floating bearing base 118 and main stage floating bearing base 128 is equivalent to the gap in FIG. 3b. The expansion bends enable a greater shifting between preliminary stage floating bearing base 118 and main stage floating bearing base 128 without plastic deformation of crosspieces 302.

Figure 4:
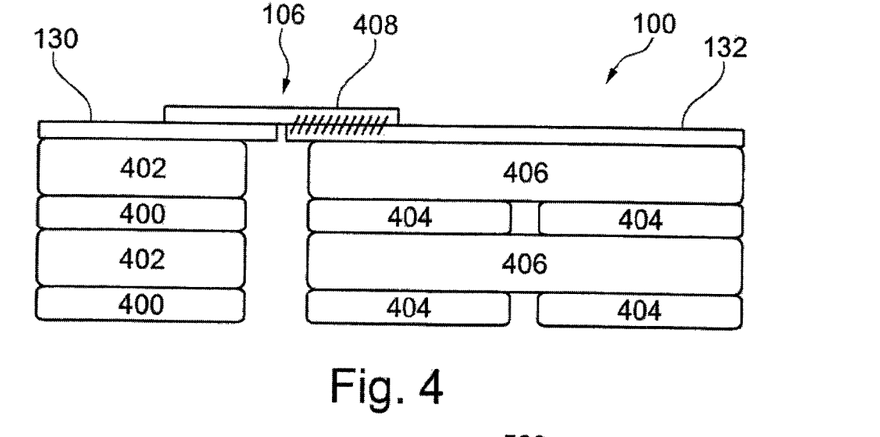
FIG. 4 shows a sectional view of a heat exchanger according to an exemplary embodiment of the present invention.

FIG. 4 shows an illustration of a section through a heat exchanger 100 according to an exemplary embodiment of the present invention. Shown is a preliminary stage stack of preliminary stage channels 400 with preliminary stage corrugated fins 402 disposed therebetween, and a main stage double stack of main stage channels 404 with continuous main stage corrugated fins 406 disposed therebetween. Both stacks are disposed without direct contact to one another. As in the heat exchanger in FIG. 1, the preliminary stage stack is covered with a preliminary stage side plate 130, and the main stage double stack is covered with a main stage side plate 132. In contrast to the heat exchanger in FIG. 1, there is a gap between side plates 130 and 132. Compensating component 106 has a cover plate 408, which covers the gap and lies on side plates 130, 132. Cover plate 408 is fixedly connected to main stage side plate 132 and can slide on preliminary stage side plate 130. In this exemplary embodiment, cover plate 408 is connected to main stage side plate 132 by means of a solder joint.

Figure 5A:
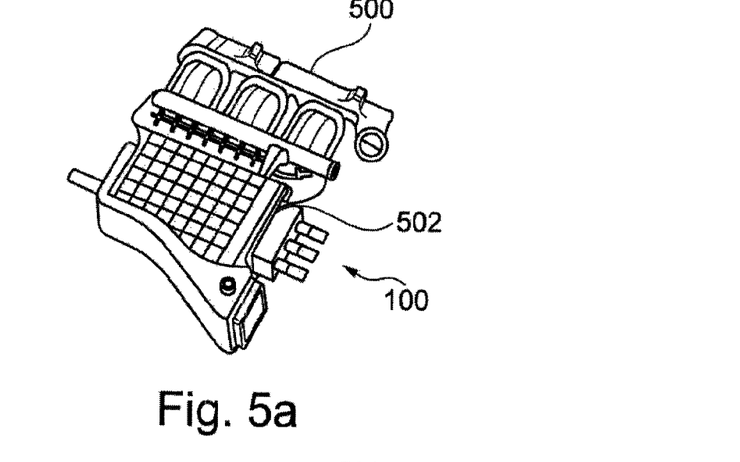
FIG. 5a shows an illustration of a heat exchanger according to an exemplary embodiment of the present invention in an intake duct.
Figure 5B:
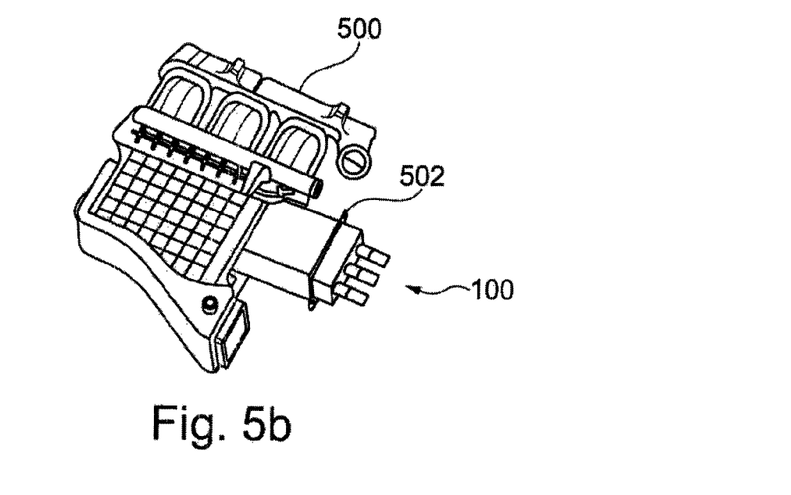
FIG. 5b shows an illustration of a heat exchanger according to an exemplary embodiment of the present invention during sliding into an intake duct.

FIGS. 5a and 5b show two views of a heat exchanger 100 according to an exemplary embodiment of the present invention.

FIG. 5a shows heat exchanger 100 built into an intake duct 500 of an internal combustion engine. The sealing and fastening flange 502, as it is shown in FIG. 1, is fastened at an interface of intake duct 500 and holds heat exchanger 100 in a seat for heat exchanger 100. The supply line for the coolant of the preliminary stage projects from intake duct 500 on a side, opposite to flange 502, of heat exchanger 100.

FIG. 5b shows heat exchanger 100 during the sliding into intake duct 500. The sealing and fastening flange 502 can be seen better here.

Different exemplary embodiments of the present invention will be described in greater detail below with use of the figures.

Indirect charge air coolers 100 can be slid or inserted as a slide-in solution or as an insertion solution into intake duct 500 for a single-stage charge air cooling. The use of a "cascaded" charge air cooling by means of high- and low-temperature circuit 102, 104 is made possible with the approach presented here based on the steadily rising requirements for charge air cooling. The integrated charge air cooling offers a reduced packaging and a small charge air pressure drop and an increased cooling performance by means of a cascaded charge air cooling. Based on a different temperature level in high-temperature coolant circuit 102 and low-temperature coolant circuit 104, thermomechanical stresses, which could ultimately lead to damage to the component, build up without any additional measures in the one-piece component. In the approach presented here, an indirect, cascaded charge air cooling is presented, integrated into the intake manifold, with a suitable thermomechanical separation 106 between the two different water circuits with a simultaneously compact construction.

In an arrangement of a plurality of tube rows in the flow direction of the charge air, with simultaneous carrying of differently tempered cooling media, extreme thermomechanical stress can occur without further measures at connecting parts such as the bases, because of the different thermal expansions. Such stress can lead to uncontrolled damage to these structural parts.

If the two cooling units, therefore the high-temperature and low-temperature units, of the cascaded charge air cooling are made as a single cooler, an integration with respect to packaging and costs is difficult because there are more individual parts and sealing elements. Likewise, the production of two single parts is more cost-intensive.

The approach described here shows a single-piece cascaded charge air cooling integrated into an intake module with the smallest dimensions possible. Function-impairing damage to the part due to thermal expansions can no longer occur. The part can be fabricated and assembled in a process as simple and cost-effective as possible.

To assure the smallest possible dimensions of the single-piece, cascaded, indirect charge air cooler 100, high-temperature stages 102 and low-temperature stages 104 are placed as close as possible to each other. This can be accomplished in that tubes 400, 404 through which the two coolants flow, therefore the high-temperature and low-temperature coolant, have a mutual base 200 at least on one side. The mutual base 200 on the one side can then be used for fastening the one-piece, cascaded, indirect charge air cooler 100 to the intake module 500, e.g., by means of screwing together. Accordingly, this side is called fixed bearing side 200 below.

Based on the thermal expansions and production tolerances, the opposite side of the charge air cooler, called floating bearing side 300 below, can be placed floating in the axial direction, therefore in the main expansion direction of tubes 400, 404, in intake module 500. The floating placement can be realized, e.g., in that floating bearing base 300 on all four sides of intake unit 500 is placed in fact transverse to the coolant flow direction but not in the axial direction.

To satisfy the different thermal expansions between high-temperature stage 102 and low-temperature stage 104, thermomechanical decoupling elements 106 are employed between high-temperature stage 102 and low-temperature stage 104.

Basically, the thermomechanical decoupling 106 is achieved in that the two coolant stages 102, 104 outside the fixed bearing base 200 are made totally decoupled from one another. This requires a larger number of single parts, however, because in addition a floating bearing base 300, two side plates 130, 132, and additional sealing elements, among others, are needed for the mutual sealing of the two coolant stages 102, 104.

If a mutual base 300 is used in the area of floating bearing side 300, the thermomechanical decoupling between high-temperature stage 102 and low-temperature stage 104 can be accomplished, e.g., in that floating bearing base 300 in the area between high-temperature stage 102 and low-temperature stage 104 is provided with a type of abrupt change in stiffness or strength. For example, there can be a plurality of slots between high-temperature stage 102 and low-temperature stage 104, which are implemented in floating bearing base 300 and in turn can vary in number and dimensions.

FIG. 3b shows a different way of realizing thermomechanical decoupling in floating bearing region 300. The two base halves 118, 128 are held together by crosspieces 302, which in turn can vary in number and dimensions. In addition, expansion beads can be incorporated in the crosspiece areas as in FIG. 3c; these in turn provide for additional thermomechanical decoupling. Crosspieces 302 can be produced either as a single piece with the two base halves 118, 128, e.g., by punching or milling, or attached or soldered in afterwards.

If mutual side plates 130, 132 are used at the top or bottom side, the thermomechanical decoupling can be achieved in that side plates 130, 132 between the two high-temperature stages 102 and low-temperature stages 104 also experience a type of abrupt change in stiffness or strength. This is realized with a kind of perforation in FIG. 1.

Another way of realizing the thermomechanical decoupling in the area of side plates 130, 132 is shown in FIG. 4. In this case, the two high-temperature and low-temperature stages 102, 104 have separate side plates 130, 132. For sealing on the charge air side, an overlapping plate 408 is used in the intermediate region; however, it is attached or soldered only at one of side plates 132, here from low-temperature stage 104. This achieves that overlapping plate 408 can slide along the underlying side plate 130, which is not soldered, because of the different thermal expansions of the two coolant stages 102, 104, and thereby can carry out its function of sealing on the charge air side.

In the area of corrugated fin 402, 406 as well, there is the possibility of implementing a type of thermomechanical decoupling. Basically, corrugated fins 402, 406 can be made separately for both high-temperature 102 and low-temperature 104 stages, so that the corrugated fins extend only in the area of high-temperature 400 and low-temperature 404 tubes. If the intention is to bridge the intermediate region with corrugated fins 402, 406, the spacing of corrugated fins 402, 406 can be selected in such a way that the corrugated fin ends abut directly in the intermediate region.

Another option for thermomechanical decoupling in the corrugated fin area is the perforation thereof, as in the case of the side plates.

The above-described thermomechanical decoupling options in the area of floating bearing base 300 by slots or crosspieces, in the area of side plates 130, 132 by perforation, and in the area of corrugated fins 402, 406 by perforation can simultaneously assume the function of predetermined breaking points during the operation of the one-piece cascaded indirect charge air cooler 100. In the case of supercritical expansion differences, the provided decoupling elements 106 would then break, and thereby prevent damage in functionally relevant areas, such as tubes, tanks, or tube-base connections.

In the case of a one-piece design, fewer individual parts are needed for the production. The smaller number of individual parts is easier to use in the process of assembly or block production. In the case of the one-piece variant, fewer sealing elements and fastening points are needed during integration in intake module 500.

The described exemplary embodiments have been selected only by way of example and can be combined with one another.

What is claimed is:

1. A heat exchanger for cooling charge air for an internal combustion engine of a motor vehicle, the heat exchanger comprising:

a preliminary stage that has at least one preliminary stage fixed bearing base and a preliminary stage floating bearing base, the preliminary stage having a heat transfer region, in which at least one preliminary stage channel for a preliminary stage coolant is disposed between the preliminary stage fixed bearing base and the preliminary stage floating bearing base, and at least one preliminary stage side plate adapted to delimit the heat transfer region of the preliminary stage, the preliminary stage side plate extending between the preliminary stage fixed bearing base and the preliminary stage floating bearing base;

a main stage that has at least one main stage fixed bearing base and a main stage floating bearing base, the main stage fixed bearing base being connected fixedly to the preliminary stage fixed bearing base, the main stage having a heat transfer region, in which at least one main stage channel for a main stage coolant is disposed between the main stage fixed bearing base and the main stage floating bearing base, and at least one main side plate adapted to delimit the heat transfer region of the main stage, the main stage side plate extending between the main stage fixed bearing base and the main stage floating bearing base, the main stage side plate and the preliminary stage side plate being separated by a gap; and a compensating component for compensating a change in a distance between the preliminary stage side plate of the preliminary stage and the main stage side plate of the main stage, the distance being changed based on a difference in elongation between the at least one preliminary stage channel and the at least one main stage channel due to thermal induction, a direction of the distance being substantially perpendicular to a direction of the preliminary stage coolant flowing in the preliminary stage channel, the compensating component being a cover plate fixedly attached to one of the preliminary stage side plate and the main stage side plate and non-fixedly attached to the other one of and the preliminary stage side plate and the main stage side plate, the cover plate covering the gap between the preliminary stage side plate and the main stage side plate, wherein the preliminary stage floating bearing base and the main stage floating bearing base are non-fixedly connected, wherein the preliminary stage fixed bearing base and the main stage fixed bearing base are fixedly connected to each other via a flange, wherein the preliminary stage side plate and the main stage side plate extend along the same plane, and wherein the main stage channel includes an inlet and an outlet for the main stage coolant, and wherein the inlet and the outlet of the main stage channel are disposed on a same side of the main stage channel.

2. The heat exchanger according to claim 1, wherein the preliminary stage and the main stage each have at least one corresponding corrugated fin in the heat transfer region, which is connected to the preliminary or main stage channel in a heat-conducting manner.

3. The heat exchanger according to claim 1, further comprising a seat, wherein the preliminary stage floating bearing base and the main stage floating bearing base are connected and together have an outer contour having a predetermined shape for fastening the heat exchanger.

4. The heat exchanger according to claim 1, wherein further comprising a seat, the preliminary stage fixed bearing base and the main stage fixed bearing base together form a flange for fastening the heat exchanger.

5. The heat exchanger according to claim 1, wherein the direction of the distance is also substantially perpendicular to a direction of the main stage coolant flowing in the main stage channel.

6. The heat exchanger according to claim 1, wherein air is flown through inside of the heat exchanger, and wherein a direction of the air flowing inside the heat exchanger is substantially perpendicular to the direction of the preliminary stage coolant flowing in the preliminary stage channel.

7. The heat exchanger according to claim 1, wherein the inlet and the outlet of the main stage channel are disposed on the main stage fixed bearing base.

8. The heat exchanger according to claim 1, wherein the preliminary stage channel includes an inlet and an outlet for the preliminary stage coolant, and wherein the inlet and the outlet of the preliminary stage channel are disposed on opposite sides of the preliminary stage channel.

9. The heat exchanger according to claim 8, wherein the inlet of the preliminary stage channel is disposed on the preliminary stage floating bearing base, and the outlet of the preliminary stage channel is disposed on the preliminary stage fixed bearing base.

10. The heat exchanger according to claim 1, wherein the preliminary stage includes a preliminary stage longitudinal side connecting the preliminary stage floating bearing base and the preliminary stage fixed bearing base, wherein the main stage includes a main stage longitudinal side connecting the main stage floating bearing base and the main stage fixed bearing base, and wherein a distance between the preliminary stage longitudinal side and the main stage longitudinal side increases or decreases on a side of the preliminary stage floating bearing base and the main stage floating bearing base, while the distance is unchanged on a side of the preliminary stage fixed bearing base and the main stage fixed bearing base.

11. The heat exchanger according to claim 1, wherein the preliminary stage fixed bearing base and the preliminary stage floating bearing base have at least one slot pattern aperture that receives the preliminary stage channel.

12. The heat exchanger according to claim 1, wherein the main stage fixed bearing base and the main stage floating bearing base have at least one slot pattern aperture that receives the main stage channel.

* * * * *

UNITED STATES PATENT AND TRADEMARK OFFICE
CERTIFICATE OF CORRECTION

| | | |
|---|---|---|
| PATENT NO. | : 9,551,274 B2 | Page 1 of 1 |
| APPLICATION NO. | : 13/621575 | |
| DATED | : January 24, 2017 | |
| INVENTOR(S) | : Eilemann et al. | |

It is certified that error appears in the above-identified patent and that said Letters Patent is hereby corrected as shown below:

On the Title Page

Change from:
Inventors: Ruediger KOELBIN

To:
Inventors: Ruediger KOELBLIN

Signed and Sealed this
Tenth Day of April, 2018

Andrei Iancu
*Director of the United States Patent and Trademark Office*